Patented Feb. 21, 1933

1,898,057

UNITED STATES PATENT OFFICE

ZOLTAN J. KISH, OF PITTSBURGH, PENNSYLVANIA, ASSIGNOR TO NORTHWESTERN YEAST COMPANY, OF CHICAGO, ILLINOIS, A CORPORATION OF ILLINOIS

YEAST COMPOSITION FOR USE IN CANDY MAKING

No Drawing.   Application filed October 3, 1929.   Serial No. 397,153.

This invention relates to the manufacture of candy. More particularly, it relates to a composition of matter for use in the manufacture of candy.

In the art and science of manufacturing candy it is often desired that certain types of goods shall have a soft consistency; further, it is desirable that it be of very smooth texture. The degree of density and firmness, as well as the smoothness, determines how palatable the candy is to the consumer. Despite the desirability of these requirements in the marketable product, the candy must be sufficiently stiff at the time of its manufacture to permit of its being handled. This ideal can be attained, if the crystallization of the sucrose in the candy can be more or less controlled. The object of my invention is to provide a composition of matter, by the aid of which these desiderata may be accomplished in a simple and effective manner. My composition, hereinafter described, is a powder and for convenience will be referred to as such. With the exception of the addition of my powder my procedure in no way interferes with nor alters the present formulæ of candy manufacturers. All this I accomplish in an economical manner. The candy made with the use of my powder will be, when it reaches the consumer, of a soft velvety texture free of "blows".

Use of my powder produces (a) a better confection than heretofore possible; (b) one which does not dry out so easily; (c) one which has a longer "keeping life"; (d) one which has uniform smoothness and yet is not syrupy. My powder makes possible the production of (a) hand rolled candies and (b) "chewey pieces" of exceptional flavor and consistency. It is to be understood that my powder can be used in either hand or machine candy manufacture; that is, its use is not limited to particular processes.

My powder consists of a tri-hydric alcohol, an organic acid, an innocuous inorganic salt and dry living yeast cells on a suitably predominating carbohydrate carrier. Specifically I have found the following mixture highly satisfactory:

| | Parts by weight |
|---|---|
| Glycerine | 18 |
| Citric acid | 4 |
| Magnesium sulphate | 2 |
| Dry yeast as for example the commercial, product known as Yeast Foam | 100 |
| Tapioca starch | 200 |

The complete mixture being finely ground and intimately mixed.

The dry, live yeast, here used, is the long and well known commercial product—"Yeast Foam". It is clearly to be understood that there is nothing in principle to prevent using any other form of live yeast cells in lieu of this product. Further, within reasonable limits the above proportions of all ingredients can be varied.

The citric acid ingredient serves to acidify the candy mixture thereby rendering the invertase of the yeast more active than it would be were the reaction carried out under conditions of neutrality. There is an optimum condition for each enzyme at which the enzyme will function most efficiently and I approach such a condition for invertase by slightly acidifying the candy mixture by incorporating citric acid. It is obvious that other acids and/or salts may be utilized for the purpose.

The presence of magnesium sulphate serves to increase the solubility of the sucrose in the limited quantity of moisture present in the candy mix, thus permitting a larger amount of the sucrose to be subjected to inversion in the presence of the invertase component of the yeast.

As illustrative of methods of practicing my invention, given by way of examples only and without limiting myself to the details of such examples, highly satisfactory candy may be made as follows:

Example 1

For "chewey" candies, such as carmels: raise to a temperature of 242° F. to 244° F. a mixture of 20 lbs. cane sugar, 20 lbs. corn syrup, 2 gals. sweet cream—30% then add 2 lbs. unsalted butter; take off the fire; reduce temperature to about 150° F.; add 1 lb. of my power; flavor as desired, mix quickly, and pour on a cooling slab; when cold, cut into small squares and wrap.

Example 2

Hand rolled creams: raise to a temperature of 248° F. a mixture of 40 lbs. cane sugar, 10 lbs. corn syrup, 2 gals. of water, and pour this batch on a moistened slab or into a "cream beater". When temperature is reduced to a finger heat or about 150° F., add a thoroughly beaten mixture of 24 whites of eggs containing 4 lbs. corn syrup and then add 20 ozs. of my powder and finish creaming; when cream is cold, flavor as desired, hand roll and dip.

Example 3

Cream for machine depositors.

*Part 1.*—80 lbs. cane sugar are dissolved in 4 gals. water, boiled to 242° F., and to this 20 lbs. raw corn syrup added, mixed thoroughly, fire then shut off, and poured into a cream beater; when cooled to about 150° F., cream.

*Part 2.*—In a clean copper kettle, cook to 238° F., 40 lbs. granulated sugar in 2 gals. water; then shut off fire; stir into this 10 lbs. corn syrup and 50 lbs. of cream of Part 1; when all thoroughly mixed, add flavor and 2 to 4 lbs. of my powder; the amount of my powder used depends on the time goods are to be stored before going to market.

In practice I have found that, where goods are to be stored 2 months or longer, it is desirable to use 2% of my powder; where storage is for 1 month, 3% of my powder; where storage is for 2 weeks or less, 4% of my powder.

Attention is now specifically directed to the the fact that goods made with my powder are sufficiently hard to be easily handled in manufacture, and that my powder softens them during storage and thereby prevents "blows". The amount of my powder to be used is dependent upon the time of storage, as above indicated.

Of course, there is nothing in principle to prevent the substitution of an invertase solution, regardless of source, so long as non-toxic, or autolized yeast, possessing invertase activity, in lieu of the dry live yeast cells herein called for. The use of other organic acids or acid salts, in lieu of citric acid, is to be understood as falling within the scope of my invention. Possible substitutes for the starch carrier are other sugars, powdered milk, and like substances.

Having described my invention and illustrated uses of it, what I claim as new and desire to secure by Letters Patent is:

1. A new composition of matter, for use in candy making, consisting of approximately 18 parts glycerine, 4 parts citric acid, 2 parts magnesium sulphate, 100 parts yeast and 200 parts tapioca starch.

2. A new composition of matter for use in candy making, comprising glycerine, citric acid, magnesium sulphate and live yeast.

3. A new composition of matter for use in candy making comprising glycerine, citric acid, magnesium sulphate, live yeast and starch.

In witness whereof, I have hereunto subscribed my name.

ZOLTAN J. KISH.